US012190089B2

(12) United States Patent
Lv (10) Patent No.: US 12,190,089 B2
(45) Date of Patent: Jan. 7, 2025

(54) APPLICATION INSTALLATION ON A REMOTE DESKTOP USING LOCAL INSTALLATION FILES (71) Applicant: VMware LLC, Palo Alto, CA (US)

(72) Inventor: Lin Lv, Beijing (CN)

(73) Assignee: Omnissa, LLC, Mountain View, CA (US)

( * ) Notice: Subject to any disclaimer, the term of this patent is extended or adjusted under 35 U.S.C. 154(b) by 37 days.

(21) Appl. No.: 17/680,820

(22) Filed: Feb. 25, 2022

(65) Prior Publication Data
US 2023/0251842 A1 Aug. 10, 2023

(30) Foreign Application Priority Data
Jan. 13, 2022 (WO) ................ PCT/CN2022/071806

(51) Int. Cl.
G06F 8/61 (2018.01)
G06F 9/451 (2018.01)
(52) U.S. Cl.
CPC ............... G06F 8/61 (2013.01); G06F 9/452 (2018.02)
(58) Field of Classification Search
CPC ........................................................ G06F 8/61
See application file for complete search history.

(56) References Cited

U.S. PATENT DOCUMENTS

| 6,941,470 | B1* | 9/2005 | Jooste | G06F 21/53 |
| | | | | 713/182 |
| 8,494,964 | B1* | 7/2013 | Sanderson | G06F 21/121 |
| | | | | 705/77 |
| 2011/0029968 | A1* | 2/2011 | Sanders | G06F 9/45537 |
| | | | | 718/1 |
| 2016/0247207 | A1* | 8/2016 | Yeom | G06Q 30/02 |
| 2018/0211036 | A1* | 7/2018 | Zlotnik | H04L 63/02 |
| 2018/0324156 | A1* | 11/2018 | Mu | H04W 4/80 |
| 2020/0344067 | A1* | 10/2020 | Fradkin | G06F 16/164 |
| 2020/0374238 | A1* | 11/2020 | Momchilov | H04L 47/781 |

* cited by examiner

Primary Examiner — Jae U Jeon
(74) Attorney, Agent, or Firm — Kim & Stewart LLP (57) ABSTRACT System and method are described for seamlessly installing applications on remote virtual desktops from installation files located on the local client device by redirecting the installation to the virtual desktop, while giving users an experience akin to installing applications on the local operating system. A request can be received on the client device to install an application from a corresponding installation file located on the client device, in a remote virtual desktop. In response to the request, a virtual desktop session can be established on the virtual desktop and the installation file can be redirected to the virtual desktop, where it can be launched to begin installing the application. To enable user interaction during the installation process, the application installation user interface (UI) can be streamed to the client device and user inputs into the installation UI can be conveyed back to the virtual desktop to be effectuated therein.

17 Claims, 5 Drawing Sheets

APPLICATION INSTALLATION ON A REMOTE DESKTOP USING LOCAL INSTALLATION FILES

CLAIM OF PRIORITY

This application is based upon and claims the benefit of priority from International Patent Application No. PCT/CN2022/071806, filed on Jan. 13, 2022, which is incorporated by reference herein in its entirety.

TECHNICAL FIELD

The present disclosure generally relates to virtual desktops and more specifically to techniques for installing applications in virtual desktops using local installation files.

BACKGROUND

Virtual desktops provided as part of a virtual desktop infrastructure (VDI) or desktop-as-a-service (DAAS) offerings are becoming more commonplace in today's enterprise work environments. The security of having a remotely stored desktop, ability to access the desktop from any location and on any device, centralized desktop management, efficient use of hardware resources, as well as numerous other benefits made possible by VDI/DAAS are a large benefit for many organizations.

In a conventional VDI or DAAS environment, each user in an enterprise is provisioned a virtual desktop and is allowed to access his or her virtual desktop over a remote network connection, such as a WAN connection. The virtual desktops are typically hosted on servers that reside in a data center of the enterprise or a third-party service provider, and each host server may execute multiple virtual desktops. Users can utilize a client device to remotely log into their individual virtual desktop and all of the application execution takes place on the remote host server which is linked to the local client device over a network using a remote display protocol, such as remote desktop protocol (RDP), PC-over-IP protocol (PCoIP), VMware Blast Extreme, virtual network computing (VNC) protocol, or the like. Using the remote desktop protocol, the user can interact with applications of the virtual desktop, which are running on the remote host server, with only the display, keyboard, and mouse information communicated with the local client device. A common implementation of this approach is to host multiple desktop operating system instances on separate virtual machines deployed on a server hardware platform running a hypervisor.

While a virtual desktop offers many advantages over traditional, local systems, various limitations and challenges exist due to the remote distribution of the computing environment. For example, to install an application in a remote desktop, a user would typically need to log into the remote desktop, download the installation file to the local desktop (e.g., from a website), execute the installer, and go through the installation process on the remote desktop. In some cases, a user may have installation files on the user's client device and the user may wish to install the application in the remote desktop instead of the local client device. Using installation files that are located on the local device, the user generally needs to perform multiple steps. First, the user needs to launch the virtual desktop client on the local device. Then, connect to a connection server by inputting user credentials, connect to the remote desktop where the user wants to install the application, copy the installation files from the local device to the remote desktop, run the installation files in the remote desktop to start the installation, and finally launch the installed application on the remote desktop. Hence, the process for installing remote applications using local installation files is time-consuming and inconvenient for the user. It requires multiple steps that must be manually performed by the user. Further, the user must transfer the local installation files to the remote desktop before they can begin the installation, which can be time-consuming and disruptive, particularly when the installation files are large, and the network is slow.

What is needed is a more efficient way for installing applications in virtual desktops using local installation files.

DETAILED DESCRIPTION

Systems and methods in accordance with various embodiments of the present disclosure overcome at least some of the above-mentioned shortcomings and deficiencies by providing efficient ways for installing applications in virtual desktops using installation files located on the local client device. In particular, embodiments described herein provide solutions for seamlessly installing remote applications by redirecting installation files located on a local client device to a remote desktop, while giving users an experience akin to installing applications on the local operating system (OS).

The process can begin with the user producing an input requesting to install an application, for which a corresponding installation file is located on the local user device, in a remote virtual desktop. For example, when the user right-clicks the installation file located on the client device (e.g. a .msi file on a Windows OS (available from Microsoft Corporation), a .dmg file on a macOS (available from Apple, Inc.) a .bundle file on a Linux OS, etc.), they can be presented with a context menu allowing the user to select a remote desktop in which to directly install the application.

Once the user selects a remote desktop (e.g., by clicking on it in the menu), a virtual desktop client application ("VDI client") can be launched on the client device to handle the request, if such VDI client is not already running. The user may also need to input credentials to access the remote desktop if the user does not already have a live session on the remote desktop. After the user is validated, the installation of the file can be redirected to the remote desktop and the installation can be launched on the remote desktop automatically to install the application.

Various techniques can be used for redirecting the installation to the virtual desktop without copying or transferring the installation file to the remote desktop, such as client drive redirection (CDR). Generally, with these approaches the installation file can remain on the client device but input and output (I/O) requests can be routed to the installation file from the virtual desktop so that the file can be executed in the virtual desktop while the installation file data remains on the client device, thereby avoiding the need to transfer the file to the virtual desktop. Nonetheless, in other embodiments, the installation can be redirected by copying or transferring the actual installation file to the virtual desktop and launching the installation on the virtual desktop from the transferred installation file now located on the virtual desktop, although this approach is likely to be less efficient.

Once the installation process begins in the virtual desktop, the application installer can produce an installation user interface (UI), which would be presented in the virtual desktop GUI (e.g., the "wizard" or "setup assistant" produced by the application that guides the user through the process, demonstrates progress (e.g., a progress bar), asks for user inputs to configure and confirm the installation, etc.). To allow the user to view and interact with the installation UI, the installation UI can be streamed from the virtual desktop to the VDI client and the VDI client can present the installation UI to the user (e.g., in a window). User inputs into the installation UI can be received on the VDI client (e.g., via the window) and conveyed to the virtual desktop to be effectuated therein.

In various embodiments, the installation UI can be streamed via a virtual desktop session established by the VDI client on the virtual desktop. In this case, the installation UI window can be produced on the VDI client by streaming the virtual desktop GUI from the virtual desktop and cropping (such as by cutting or making transparent) other portions of the GUI so that only the portion of the GUI showing the installation window is displayed and so that only that portion of the GUI is able to receive user inputs. This way, the user experience can be akin to installing an application on the local device (the remote desktop GUI is made transparent so that only the installation UI window is displayed on the VDI client).

After the installation on the remote desktop is finished, the user can be given an option to run the newly installed application as a seamless remote application (e.g., as a virtual application that is executing on the virtual desktop). Thus, the entire process of installing the remote application can provide substantially the same convenient user experience as installing the application on a local device.

It should be noted that, in various embodiments, if the user is already connected in a remote desktop session to the virtual desktop and has a window to the virtual desktop open on the user device when they request to install the application, then the user will already be able to see the installation UI window in the virtual desktop (i.e., within the GUI that is being streamed to the VDI client window open on the client device) and therefore the step of hiding the portions of the GUI other than the installer window may be skipped by the process, since the user may already be viewing the virtual desktop GUI in which the installation UI window is presented.

As used throughout this disclosure in the context of remote desktop environments, the terms, "desktop", "remote desktop", and "virtual desktop" are used interchangeably and refer to an instance of an operating system and/or applications that run(s) remotely with respect to the user. In a conventional VDI or DAAS environment, each virtual desktop corresponds to a virtual machine (VM) executed on a host server (i.e., a host computing device) that is physically located in a remote datacenter. Each host server may host any number of virtual machines (e.g., tens, hundreds, etc.) and each virtual machine may be owned by an individual user. The virtual machine typically includes a guest operating system (e.g., Windows) capable of executing applications for the user and the virtual machine is used to provide a virtual desktop for the individual user. The user who owns the virtual desktop can remotely log into his or her virtual desktop using a client device that establishes a network connection (e.g., Wide Area Network connection) with the host server and remotely execute various applications on the virtual machine as if the desktop was running on the user's local client device. The client device can be any computing device capable of establishing a network connection, including but not limited to personal computers (PCs), laptops, mobile phones, tablet computers, wearable devices (e.g., smart watches, electronic smart glasses, etc.), or the like.

When a client device is accessing a remote desktop using a remote desktop protocol (e.g., RDP, PCoIP, Blast, VNC, etc.), the graphical user interface (GUI) of the desktop is generated on the server, the GUI image data is then encoded and transmitted over the network to the client device, where it is decoded and displayed to the user. For example, in one embodiment, the framebuffer pixel data on the server is encoded using a codec, such as H264, and transmitted over an Internet connection to the client, where the data is decoded and rendered on a local display screen to the user. Similarly, any user input information, such as keyboard and mouse events, is transmitted from the client device to the server over the network connection, where it may in turn cause various updates to the GUI of the remote desktop. In this manner, the user can view the GUI of the remote desktop and interact with it as if the desktop was running on the local client device, even though the desktop is actually executing remotely.

In some cases, instead of providing a user with access to a full desktop session, i.e., where the user gets to see and interact with substantially the entire remote computing environment (e.g., the entire operating system, all applications, settings, etc., of the remote virtual machine), the user can be given access to a limited portion of the desktop or to a certain application or applications on the desktop, so that the user is able to see and interact with the limited portion or certain application(s) and not with other parts of the virtual desktop, which can be hidden from the user. This approach is preferable, for example, when an enterprise wishes to deliver access to a particular application to users, without giving access to the remainder of the computing environment where the application runs. This type of session may be referred to as a "virtual application", "remote application", or an "application session" throughout this disclosure and these terms may be used interchangeably. Hence, with a virtual application, the application can run inside a remote desktop but look and feel to the user on his or her client device as if only the application is executing. Behind the scenes, however, the application can be running inside a desktop session, but only the application's user interface (UI) may be visible and accessible to the user on the client device. As in a full desktop session, with virtual applications user inputs can be conveyed from the client device to the remote desktop and redirected to the operating system (OS) of the remote desktop, so that the OS can deliver the inputs to the application, while the GUI of the application is streamed back and displayed on the client device. It should be understood that the term "virtual desktop", as used herein, can apply to cases where access is provided to the substantially entire desktop as well as to cases where access is limited to certain portions of the remote computing environment, such as in the case of virtual applications.

Figure 1:
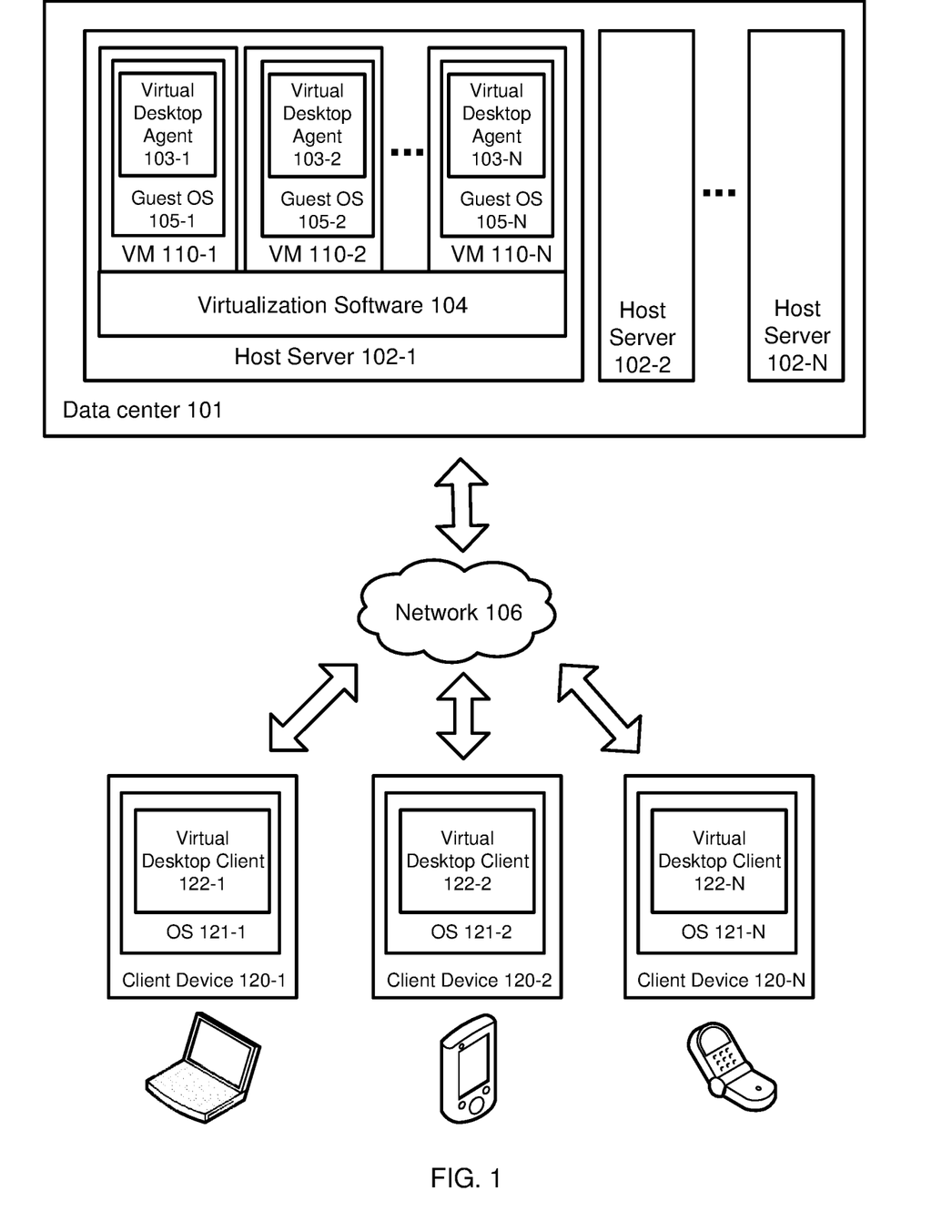
FIG. 1 illustrates an example of a virtual desktop environment, in accordance with various embodiments.

FIG. 1 illustrates an example of a virtual desktop environment, in accordance with various embodiments. The virtual desktop environment, such as VDI or DAAS environment, includes host servers (102-1, 102-2, 102-N) that are communicatively coupled with a number of client devices (120-1, 120-2, 120-N) via a network 106. Network 106 may be a wide area network (WAN), or other form of remote communication link between the host servers (102-1, 102-2, 102-N) and client devices (120-1, 120-2, 120-N). Network 106 may further include numerous other components, such as one or more firewalls, connection brokers, management servers, etc., which are not shown here so as not to obscure salient features of the remote desktop environment. Host servers (102-1, 102-2, 102-N) may physically reside in a data center 101 of the enterprise (e.g., in case of VDI) or in a data center of a third-party service provider (e.g., in case of DAAS).

By way of illustration, host server 102-1 can interoperate with client devices (120-1, 120-2, 120-N) to provide virtual desktop services to users of client devices (120-1, 120-2, 120-N). For example, host server 102-1 can host, for each user, a desktop that is presented by a guest operating system (such as one of the guest operating systems 105-1, 105-2, 105-N) running on a virtual machine (such as one of the virtual machines 110-1, 110-2, 110-N) on host server 102-1. In this context, the terms "desktop", "remote desktop", and "virtual desktop" refer to a computing environment in which a user can launch, interact with, and manage the user's applications, settings, and data. Each client device (120-1, 120-2, 120-N) can allow a user to view on a desktop graphical user interface (on a local display device) his/her desktop that is running remotely on host server 102-1, as well as provide commands for controlling the desktop. In this manner, the users of client devices (e.g., 120-1, 120-2, 120-N) can interact with the desktops hosted on host server 102-1 as if the desktops were executing locally on client devices (120-1, 120-2, 120-N).

In the embodiment of FIG. 1, host server 102-1 includes virtualization software 104 that supports the execution of one or more virtual machines (VMs) (e.g., 110-1, 110-2, 110-N). The virtualization software 104 may be a hypervisor, a virtual machine manager (VMM) or other software that allows multiple virtual machines to share the physical resources of the server. In the illustrated embodiment, each virtual machine (e.g., 110-1, 110-2, 110-N) can execute a guest operating system (e.g., 105-1, 105-2, 105-N) that hosts a desktop for a single user at a time. For example, if five users connect to host server 102-1 for the purpose of initiating remote desktop sessions, the host server 102-1 can launch five VMs, each hosting one desktop for each one of the five users. These types of virtual desktop environments where user desktops are hosted within separate, server-side virtual machines are often referred to as virtual desktop infrastructure (VDI) or Desktop-as-a-Service (DAAS) environments.

In such virtual desktop environments, each client device (e.g., 120-1, 120-2, 120-N) can execute a virtual desktop client (e.g., 122-1, 122-2, 122-N). For example, the virtual desktop client (e.g., 122-1, 122-2, 122-N) can be a stand-alone, designated client application ("native client"), or a web browser ("web client"). In some cases, a standard web browser may be modified with a plugin to operate as a web client. The interaction between the virtual desktop and the client device can be facilitated by such a virtual desktop client (e.g., 122-1, 122-2, 122-N) running in the OS (e.g., 121-1, 121-2, 121-N) on the client device (e.g., 120-1, 120-2, 120-N) which communicates with a server-side virtual desktop agent (e.g., 103-1, 103-2, 103-N) that is running on the guest OS inside the virtual machine (e.g., 110-1, 110-2, 110-N). In particular, the interaction can be performed by the virtual desktop agent transmitting encoded visual display information (e.g., framebuffer data) over the network to the virtual desktop client and the virtual desktop client in turn transmitting user input events (e.g., keyboard, mouse events) to the remote desktop agent.

It should be noted that the particular virtual desktop environment illustrated in FIG. 1 is shown purely for purposes of illustration and is not intended to be in any way inclusive or limiting to the embodiments that are described herein. For example, a typical enterprise VDI deployment would include many more host servers, which may be distributed over multiple data centers, which might include many other types of devices, such as switches, power supplies, cooling systems, environmental controls, and the like, which are not illustrated herein. Similarly, a single host server would typically host many more virtual machines than what is shown in this illustration. It will be apparent to one of ordinary skill in the art that the example shown in FIG. 1, as well as all other figures in this disclosure have been simplified for ease of understanding and are not intended to be exhaustive or limiting to the scope of the invention.

Figure 2:
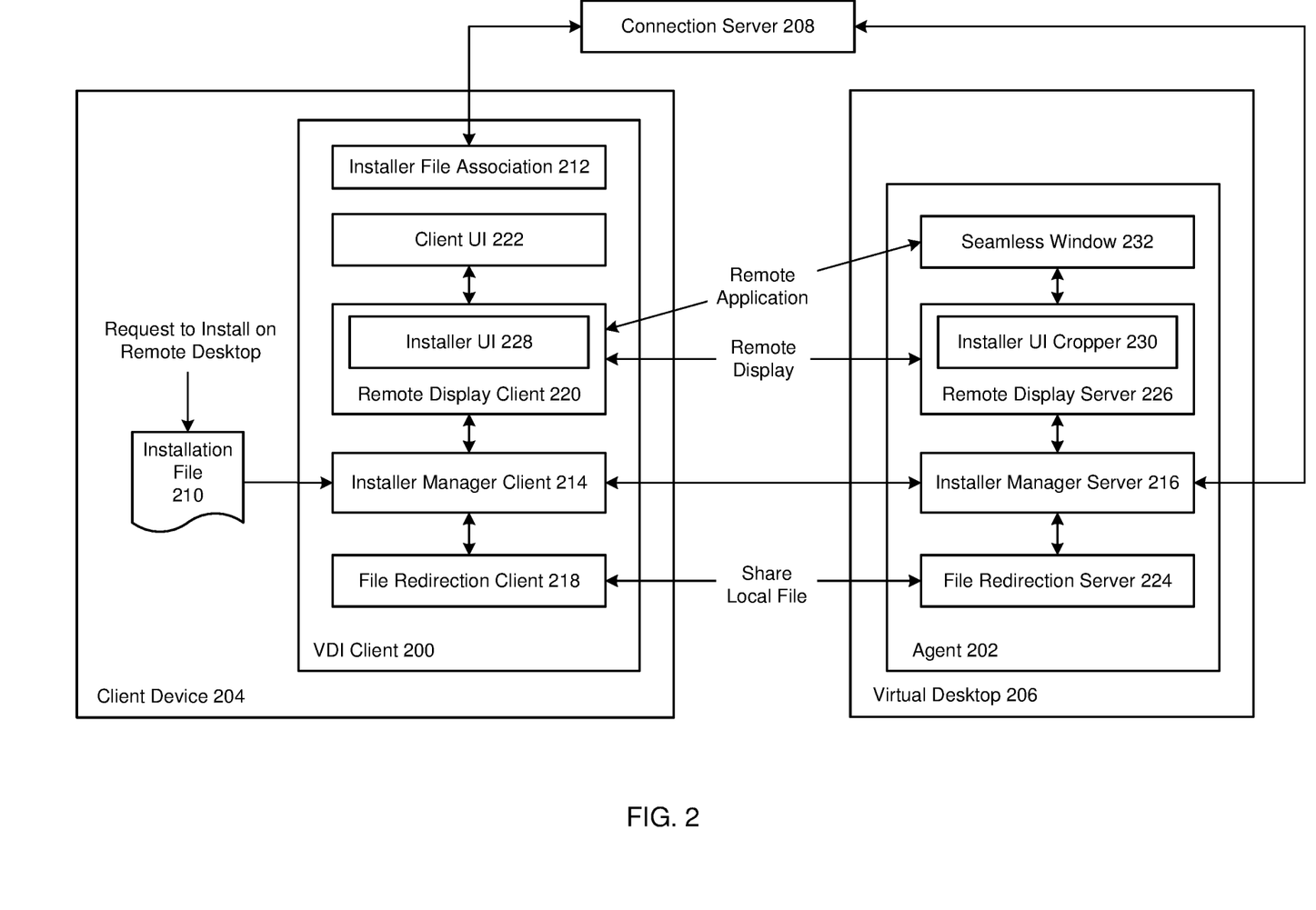
FIG. 2 illustrates an example architecture of a system for installing applications in virtual desktops using installation files located on the local client device, in accordance with various embodiments.

FIG. 2 illustrates an example architecture of a system for installing applications in virtual desktops using installation files located on the local client device, in accordance with various embodiments. The example of FIG. 2 illustrates a virtual desktop infrastructure in which a user can use a VDI client 200, which can run on a client device 204 (e.g., laptop, desktop, smartphone, tablet, etc.) to connect to a remote desktop agent 202 running in a virtual desktop 206, which can be hosted on a server. A connection server 208 (or connection "broker") can be responsible for auditing connection requests from the VDI client 200 side, validating user credentials (e.g., password and username), and brokering virtual desktop sessions (e.g., between the VDI client 200 and the agent 202). In various embodiments, the VDI client 200 and agent 202 can be a standard virtual desktop client and agent, such as the VDI client and agent in VMware Horizon virtual desktop products available from VMware, Inc., that can be modified as applicable to carry out the functions described herein by the addition of new components/modules and/or modification of certain existing components/modules, as further described below.

As illustrated, the client device 204 can contain an installation file 210, which can be any kind of file that can be run to install a corresponding application, such as a .msi, .dmg, .bundle, etc. type file. In various embodiments, to initiate the process of installing the application from the installation file 210 in the virtual desktop 206, a request can be received to install the application in the virtual desktop 206 (e.g., the user can initiate the request). Different approaches can be implemented for allowing the user to request to install the application in a virtual desktop instead of the local device 204. For example, the VDI client 200 can retrieve (e.g., from the connection server 208) a list of virtual desktops that are available or that the user is entitled to, and the user can be provided with a menu allowing them to select one of the virtual desktops for installing the application on.

In various embodiments, the user can be allowed to choose a virtual desktop from a context menu that appears in response to a user interaction with the installation file (e.g., an interaction with an object or element corresponding to the installation file), such as a mouse right-click on the installation file. Such a context menu can give the user the option to select a virtual desktop (e.g., 206) for running the installation file 210 on.

In various embodiments, an installer file association module 212 (which can be a new module added to a standard client) can run in the VDI client 200. This module can be implemented to register the extensions of installation files to the local OS, such as .msi files on Windows, .dmg files on macOS, and .bundle files on Linux, etc. When the user connects to the connection server 208 for the first time, the installer file association module 212 can communicate with the connection server 208 to retrieve remote desktops to which the user is entitled and register the desktops as handlers for the pre-defined installation file extensions. Once the installation file 210 extension is registered with the client device 200 OS, when the user accesses the context menu for files with the registered extension, such as the installation file 210 (e.g., by right-clicking the installation file 210), they can be presented with these registered remote desktops listed in the context menu so that they can select one of the remote desktops to run the installer 210 on.

In various embodiments, the first time the user connects to the connection server 208, information identifying or listing the remote desktops to which the user is entitled can be retrieved from the connection server 208 (the connection server 208 can know what desktops are entitled for this user), and the desktops can be automatically registered to the context menu. Then, any time the user pulls up the context menu (e.g., right-clicks on a registered/pre-defined file type (such as the installation file 210), they can be presented with this menu.

If the user right-clicks on an installation file (e.g., 210) when they are not logged into the connection server 208, they can be presented with the last-saved menu (i.e., from the last time the user was logged in). Then, once the user does log in (e.g., after selecting a desktop but before installation can commence), the current entitled remote desktop information can be retrieved and if there are changes, then the connection server 208 can push the latest entitled desktop information to the VDI client 200 and the VDI client 200 can update the entitled remoted desktop registry so that the context menu can subsequently display the correct list of entitled desktops.

After the request to install the application on the remote desktop 206 is received (e.g., in the client device 204 OS), the request can be conveyed to the VDI client 200. Certain information can be conveyed along with the request (e.g., as parameters), such as the installation file 210 location (e.g., file path) and information about the remote desktop on which the file is to be installed (e.g., the remote desktop that the user selected from the context menu). For example, information identifying the remote desktop 206 and a file path for the installation file 210 can be conveyed to the client VDI 200 along with the request to install the application on the remote desktop 206. In various embodiments, this can be implemented by registering the VDI client 200 as an event handler (e.g., in the client 204 OS), so that when the user requests to install the application on the remote desktop 206 (e.g., by right-clicking the installer file 210 and selecting the remote desktop 206 from the context menu), the VDI client 200 can automatically handle the event. For example, the installation file 210 path and the remote desktop-related information 206 can be passed to the VDI client 200 as parameters in the event and the VDI client 200 can automatically initiate the process of running the file identified in the path (i.e., the installation file 210) in the indicated remote desktop (i.e., remote desktop 206).

In response to the request to install the application corresponding to the installation file 210 in the remote desktop 206, the installation of the application can be redirected (e.g., by the VDI client 200) to the virtual desktop 206 and the application installation can be launched in the virtual desktop 206 from the installation file 210 to install the application in the virtual desktop 206. In various embodiments, the VDI client 200 can establish a virtual desktop session with the agent 202 (e.g., in response to the request to install the application on the virtual desktop 206) and the remote desktop session can be used to redirect the installation to the remote desktop and/or to enable the user to interact with (e.g., view and provide inputs into) the installation UI. The user may be validated before the session is permitted (e.g., required to provide login credentials).

For example, when the installation file 210 is run in the virtual desktop 206, it can produce an installation UI, which can be presented in the virtual desktop 206 GUI. In a regular virtual desktop session, the entire virtual desktop 206 GUI would be streamed to the VDI client 200 and displayed in the VDI client 200 window. However, when installing the remote application, portions of the remote desktop GUI other than the installation UI window may be unnecessary for the user to see and indeed be a nuisance. Accordingly, the portions of the GUI other than the installation UI can be cropped so that the user sees the installation UI window and not the entire desktop 206 GUI. User inputs into the installer UI window can likewise be streamed back to the virtual desktop 206 via the virtual desktop session to be effectuated therein, in the same way as user inputs into a virtual desktop are normally streamed from a VDI client to an agent in a virtual desktop session (e.g., using a remote desktop protocol); except that in this case only inputs into the installer UI may be conveyed because the remainder of the GUI is made transparent or cropped. Thus, substantially the same basic mechanism used in a remote desktop session for conveying GUI data and inputs between the VDI client 200 and agent 202 can be used for providing the installer UI to the user, except that other parts of the GUI can be hidden to only display the installer UI window, giving the user the illusion of running the installer locally.

Different approaches can be used to redirect the installation of the application to the virtual desktop 206. As mentioned above, transferring the installation file 210 from the client device 204 to the virtual desktop 206 before installation can begin may be undesirable, particularly if the file is large 210 and the network connection between the VDI client 200 and agent 202 is slow. In various embodiments, the installation file 210 can be run on the virtual desktop 206 from the client device 204. That is, the installation file 210 can remain on the client device 204 and it can be redirected to the remote desktop 206 to run the installer and install the application there. As will be described in more detail below, this can be performed by routing input/output requests between the virtual desktop 206 and the client device 204. For example, when the VDI client 200 is connected to the agent 202 in a virtual desktop session to perform the installation redirection, as described above, the routing of input/output requests can be performed using a mechanism available in the virtual desktop for accessing files/folders/drives on the client device 204, such as client drive redirection (CDR), as will be described further below. Nonetheless, while the input/output rerouting approach may be generally preferable, in other embodiments the installation can be redirected to the virtual desktop 206 by copying the installation file 210 to the virtual desktop 206 and running the installation from the copy located on the virtual desktop 206. For example, the VDI client 200 and the agent 202 can coordinate the process of copying the installation file 210 to the virtual desktop 206 and the agent can launch the installation file on the virtual desktop 206 once it is transferred.

After the installation is redirected to the virtual desktop 206 (whether by rerouting input/output requests or by copying the installation file 210 to the virtual desktop 206), the installer can be launched on the virtual desktop 206 (e.g., the agent 202 can launch the installation). During the installation process, the application can produce the installation user interface (UI), which can be presented in the virtual desktop 206 GUI by the installation running in the virtual desktop 206. The installer UI can be any kind of software wizard or setup assistant type of user interface that, for example, presents a user with a sequence of dialog boxes with questions, options, information, etc. that lead the user through a series of pre-defined steps for installing the application, as well as provide information on installation progress (e.g., status bar, etc.). In various embodiments, the installer UI can be streamed to the VDI client 200 and presented to the user in a window on the client device 204, while user inputs into the window can be received on the VDI client device 200 and conveyed to the virtual desktop to be effectuated (e.g., injected into the installation UI). This way, the user can interact with the installer UI as if the application is running locally on the VDI client device 200 while the installation is actually taking place in the virtual desktop 206. As mentioned, the installer UI can be streamed to the VDI client device 200 via a virtual desktop session established between the VDI client 200 and the agent 202, and user inputs can be conveyed back via the session as well.

Once the application installation is complete, the user can be given an option to launch the application as a remote application and if the user confirms then the application can be launched on the virtual desktop 206 and presented to the user as a virtual application on the client device 200 (e.g., by hiding other portions of the virtual desktop GUI and only displaying the application UI). As a result, the application can be installed and launched on the virtual desktop 206 while providing substantially the same user experience as when the user installs and runs the application locally on the client device 204.

In various embodiments, an installer manager client module 214 (which can be a new module added to a standard client) can operate in the VDI client 200 for performing various core functions in the installation redirection process. Before the installation redirection process can be launched, the installer manager client 214 can verify that the installation file 210 is compatible with the selected remote desktop 206. For example, when the user selects the remote desktop 206 to run the installation file 210 on, the module 214 can contact the remote desktop 206 (e.g., after the connection to the remote desktop 206 is established) to check if the installation file 210 is compatible with the OS of the remote desktop 206. In an embodiment, the installer manager client 214 may also be able to check compatibility by contacting the connection server 208 (e.g., if the connection server stores the remote desktop 206 type, then the installer manager client 214 may be able to check compatibility this way). If the installation file 210 is not compatible, a warning message can be provided to indicate this incompatibility and the installation process can be aborted. For example, if the user tries to run a .dmg file on a Windows remote desktop, they can receive a warning of incompatibility since a .dmg file is an application installer on a macOS.

In various embodiments, the installer manager client 214 can work with a corresponding installer manager server 216 on the remote desktop 206 (which can be a new module added to a standard agent) to coordinate various aspects of the installation process, such as remote desktop 206 connection (e.g., automatically establishing a remote desktop session between the VDI client 200 and the agent 202 for carrying out the redirected installation), installation redirection (e.g., redirecting the installation file 210 to be run on the remote desktop 206 with a technique such as CDR), remote display cropping (e.g., to hide portions of the virtual desktop GUI other than the installer UI), seamless application registering (e.g., to enable running the application as a remote application after installation if requested by the user), etc.

The installer manager client 214 can further work with various modules located on the VDI client 200 to carry out these and other tasks. For example, the installer manager client 214 can work with a file redirection client module 218 (which can be an existing component in a standard client/agent system used for accessing files/folder/drives on the VDI client 200 by the agent 202, or it can be a new module added to a standard agent) to initiate and carry out the installation redirection process (e.g., the installation file 210 redirection). The file redirection client 218 can coordinate with a file redirection server 224, which can work with the installer manager server 216 on the agent 202 to carry out these tasks. The file redirection server 224 can also be an existing component in a standard agent used for accessing files/folder/drives on the VDI client 200, or it can be a new module added to a standard agent).

For example, in remote desktops the CDR feature can enable users to access files and folders located on the client device 204 from within the virtual desktop session. With client drive redirection, a user can share files, folders and drives located on the local client system 204 with the remote desktop 206. For example, a user can allow applications running in the virtual desktop 206 on the host server to access files, documents, and data that are stored on the user's client device 204. To implement this feature, a CDR component on the virtual desktop (e.g., the file redirection server 224) can be utilized that forwards input/output (I/O) requests from the virtual desktop 206 to the shared directory on the client device 204 over the network (e.g., to a corresponding CDR client-side component, such as file redirection client 218). Similarly, with this feature the user can copy data from the client device 204 to a location (e.g., directory) physically located on the host server, or the user can copy data from the virtual desktop 206 on the host server to the client device 204.

For example, with the CDR feature, data located on the client device 204 can be presented in virtual drives in the virtual desktop 206. Directories, files, or drives located on the client device 204 can be presented in virtual drives in the virtual desktop 206. Users can work with the virtual drives in the same way they work with disk drives that are local on the host server, and applications running in the virtual desktop 206 can likewise access the virtual drives in the same way as local drives on the host server. When an input/output (I/O) request is produced on the virtual desktop 206 (e.g., by an application in the virtual desktop) to a shared directory/location located on the client device 204, the CDR component (e.g., 224) running in the virtual desktop 206 can forward the I/O request to the client device 204 over the network. The corresponding client-side CDR component (e.g., 218) on the client device 204 can receive and implement the I/O request, whether by retrieving data and sending it back to the virtual desktop 206, by writing to a file on the client device 204, etc. as the case may be.

Hence, in various embodiments, the file redirection client 218 can operate as a standard CDR module used in the VDI client 200, which enables sharing a local file or folder to the remote desktop 206 using the CDR feature. Likewise, the file redirection server 224 can operate as a standard CDR module used in the agent 202, which works with the file redirection client 218 to map local (client-side) files or folders to the remote desktop 206 so that they can be accessed by the remote desktop 206. For example, it can work with the file redirection client 218 to map the local installer file 210 to the remote desktop so that it can run on the remote desktop 206. After a session is established by the VDI client 200 for redirecting the installation, the VDI client 200 can request to connect to the CDR service (e.g., to the file redirection server 224) on the remote desktop 206 to share the installation file 210 (e.g., the file path) with the remote desktop side. The agent 202 can receive the file path and install the application from the file 210 on the remote desktop 206. In this case, the remote desktop 206 can access the shared file 210, which can remain on the VDI client 200 but as the installer runs the changes (or writes) can be save to the virtual desktop (e.g., to a physical location on the host server) so that the application is installed remotely in the virtual desktop 206.

It should be noted that the CDR mechanism is just one way for redirecting the installation, which can be convenient because the functionality may be available in certain client-agent systems. Nonetheless, other approaches can likewise be used in other embodiments for installing the application on the virtual desktop 206 from the installation file 210 located on the client device 204, such as copying the installation file 210 to the virtual desktop or using another means to run the installation file 210 without copying it to the virtual desktop 206 that results in the application being installed on the virtual desktop 206 (e.g., on the host server storage).

In various embodiments, the installer manager client 214 can work with a remote display client module 220 to display the graphical data of the installer UI window received from the remote desktop 206 (e.g., by providing the position of installer UI window in the remote desktop 206 so that the installer UI window can be displayed in the same place on the local device). The remote display client 220 can correspond with a remote display server 226 on the agent, which can further work with the installer manager server 216. The remote display server 226 can be responsible for sending GUI data from the virtual desktop 206 to the remote display client 220, so that the GUI data can be presented in a VDI client 200 window. For example, the remote display server 226 can stream the installer UI to the remote display client 220, so that the installer UI can be displayed to the user.

In various embodiments, the remote display client 220 and the remote display server 226 can be standard components used in a virtual desktop to stream the GUI to the client device. However, these components (220, 226) can be modified by the addition of certain logic to enable the system to only display the installer UI to the user (e.g., in the VDI client 200 window) and not the entire virtual desktop 206 GUI. For example, the remote display client 220 can be modified by adding an installer UI 228 module, which can contain certain logic to handle cropped GUI data received from the remote desktop 206. Likewise, the remote display server 226 can be modified by adding an installer UI cropper module 230, which can contain certain logic to handle sending of cropped GUI data to the VDI client 200, such as by cropping the GUI data of the virtual desktop 206 to the size of installer UI window and then sending the data to the VDI client 200.

For example, during installation redirection, the remote display server 226 can be notified that it needs to hide or crop the portions of the GUI other than the installer window. In response, the remote display server 226 can obtain information regarding the region of the installer UI window, such as the location, size, shape, etc. of the installer UI window (e.g., the remote display server 226 may be able to obtain this information from the virtual desktop 206 OS). The remote display server 226 can then use this information to crop the GUI to the size and shape of the installer UI. In various embodiments, the remote display server 216 can stream the entire desktop 206 GUI to the remote display client 220 along with information regarding the region of the installer UI, and the remote display client 220 can use the information to crop or hide all portions of the GUI other than the installer UI.

In various embodiments, the installer manager client 214 can further work with a client UI module 222 (which can be a new module added to a standard client) to control what parts of the remote desktop GUI are presented to the user (e.g., to hide the top menu bar that usually appears when a user connects to a remote desktop).

The agent 202 can further contain a seamless window module 232, which can be a feature allowing the user to open an application (virtual application) that is running in the remote desktop 206 (e.g., the application that was installed from the file 210) on the local client device 204 as if it was a locally running application, for example, by hiding portions of the desktop 206 GUI other than the application interface.

In various embodiments, the installer manager server 216 can be the core agent-side management component in the remote application installation process. For example, the installer manager server 216 can work with the installer manage client 214 on the client side to monitor and coordinate the entire process of the installation and handle any errors that may occur on the remote desktop 206 during application installation. The installer manager server 216 can receive the redirected file path from the installer manager client 214 when the installer file 210 is redirected to the remote desktop 206, launch the redirected installer file on the remote desktop 206, and obtain the installer window region information (e.g., size, shape, and position) in the remote desktop 206 OS. The installer manager server 216 can request the remote display server 226 to crop the virtual desktop 206 GUI data based on the size and position of the installer window. Further, the installer manager server 216 can communicate with the broker to register the newly installed application as a remote application (e.g., as a seamless application) after the installation is successfully performed so that the user can launch the application on the VDI client 200 just like a local application.

Figure 3A:
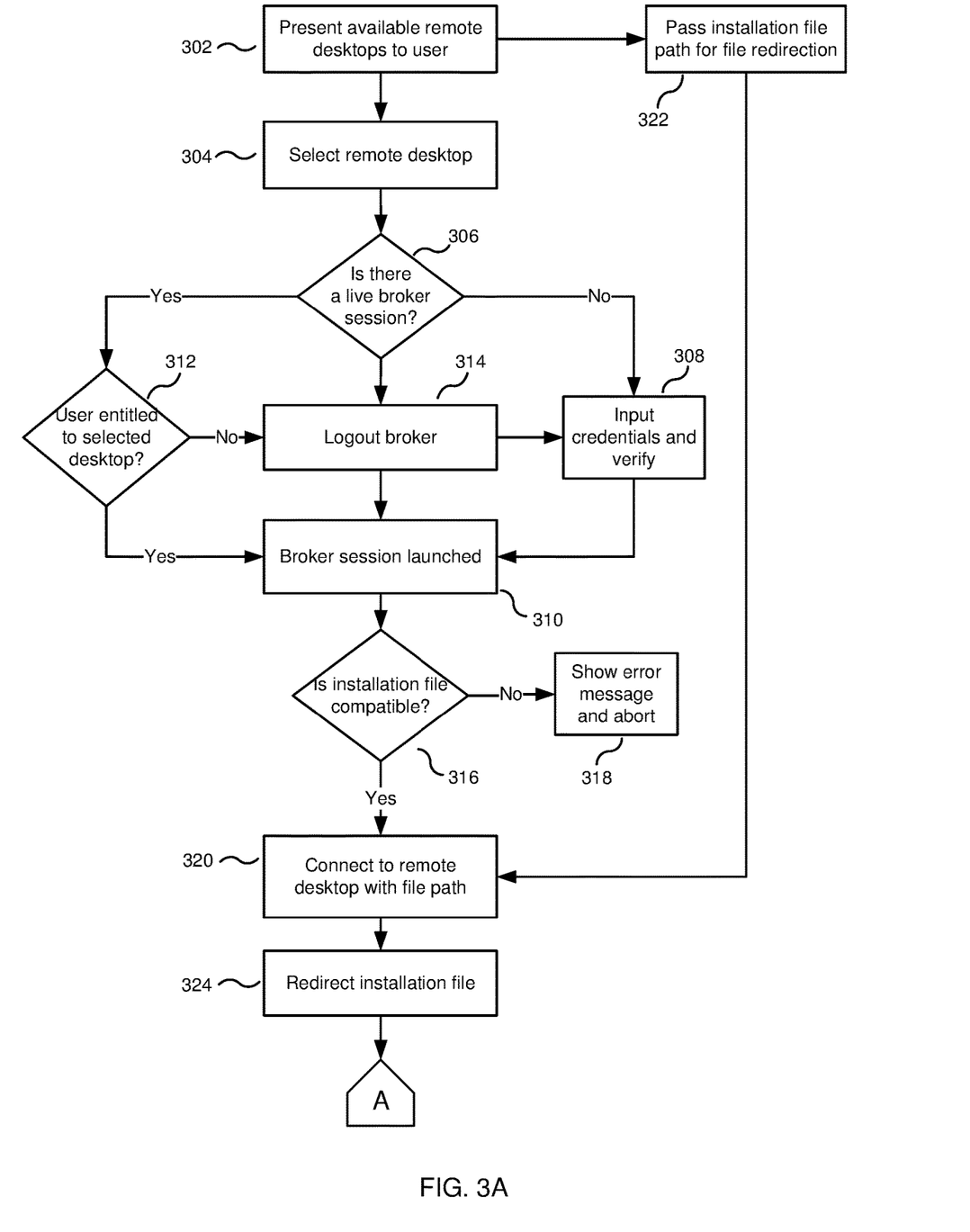
FIG. 3A illustrates the first part of an example process flow for installing applications in virtual desktops using installation files located on the local client device, in accordance with various embodiments.

FIG. 3A illustrates the first part of an example process flow for installing applications in virtual desktops using installation files located on the local client device, in accordance with various embodiments. The process can begin in operation 302, by presenting the user with available remote desktops, on which an application can be installed from an installation file located on the local client device. For example, a list of the available remote desktops can be presented to the user in a context menu that appears when the user right-clicks on an installation file on the local device.

In operation 304, a remote desktop can be selected. For example, the user may select the remote desktop from the list in the context menu. After the remoted desktop is selected, the system can check, in decision 306, whether the user has a live session with the connection broker (e.g., whether the user is logged into the connection broker). If the user does not have a live broker session, then the process can proceed to operation 308, where the user can input their login credentials (in response to an authentication request) and the credentials (e.g., username and password) can be submitted to the connection broker and verified before the user can be logged in. After the user is authenticated, the broker session can be launched in operation 310.

If, in decision 306, it is determined that there is a live broker session, then the process can proceed to operation 312, where the process can determine whether the logged in user is entitled to the selected desktop. For example, in some cases a desktop may be presented as being available to the user (e.g., in step 302) and the user may select such desktop even though the user may not actually be entitled to the desktop. For example, the list of available desktops presented in operation 302 may be outdated (e.g., a desktop may have been removed as an entitled desktop of the user). In such a case, when the user entitlement to the selected desktop is verified in decision 312, it may be determined that the user is not entitled to the selected desktop. In this case, the process can proceed to operation 314, where the broker is logged out. Then, the process can continue to operation 308, where user credentials are requested to authenticate the user, etc. If, on the other hand, in operation 312 it is determined that the user is entitled to the selected desktop, then the process can proceed to operation 310, where the broker session is launched.

After the broker session is launched, the process can check if the installation file is compatible with the remote desktop in operation 316. For example, the broker (connection server) can store information about user remote desktops. To check compatibility, the selected remote desktop's OS type can be obtained (e.g., from the connection server) and checked to determine if the installer file is compatible. If the file is not compatible, then in operation 318 the installation process can be aborted, and an error message can be displayed. If, on the other hand, the installation file is compatible, then the process can continue to operation 320.

In operation 320, the connection to the remote desktop can be established (e.g., between a VDI client on the client device and an agent in the desktop) and the file path for the installation file can be passed to the remote desktop. As illustrated, the file path can be retrieved (e.g., by the VDI client) in operation 322 and passed to the remote desktop when the connection to the remote desktop is established in operation 320, so that the file path can be used to redirect the installation file to the remote desktop in subsequent steps. For example, the file path can be retrieved when the user right-clicks on the installation file to pull up the context menu in operation 302.

In operation 324, once the virtual desktop is connected, the installation file can be redirected to the virtual desktop. For example, the installation file can be redirected using a technique such as CDR, so that the file on the client device can be accessed by the remote desktop.

Figure 3B:
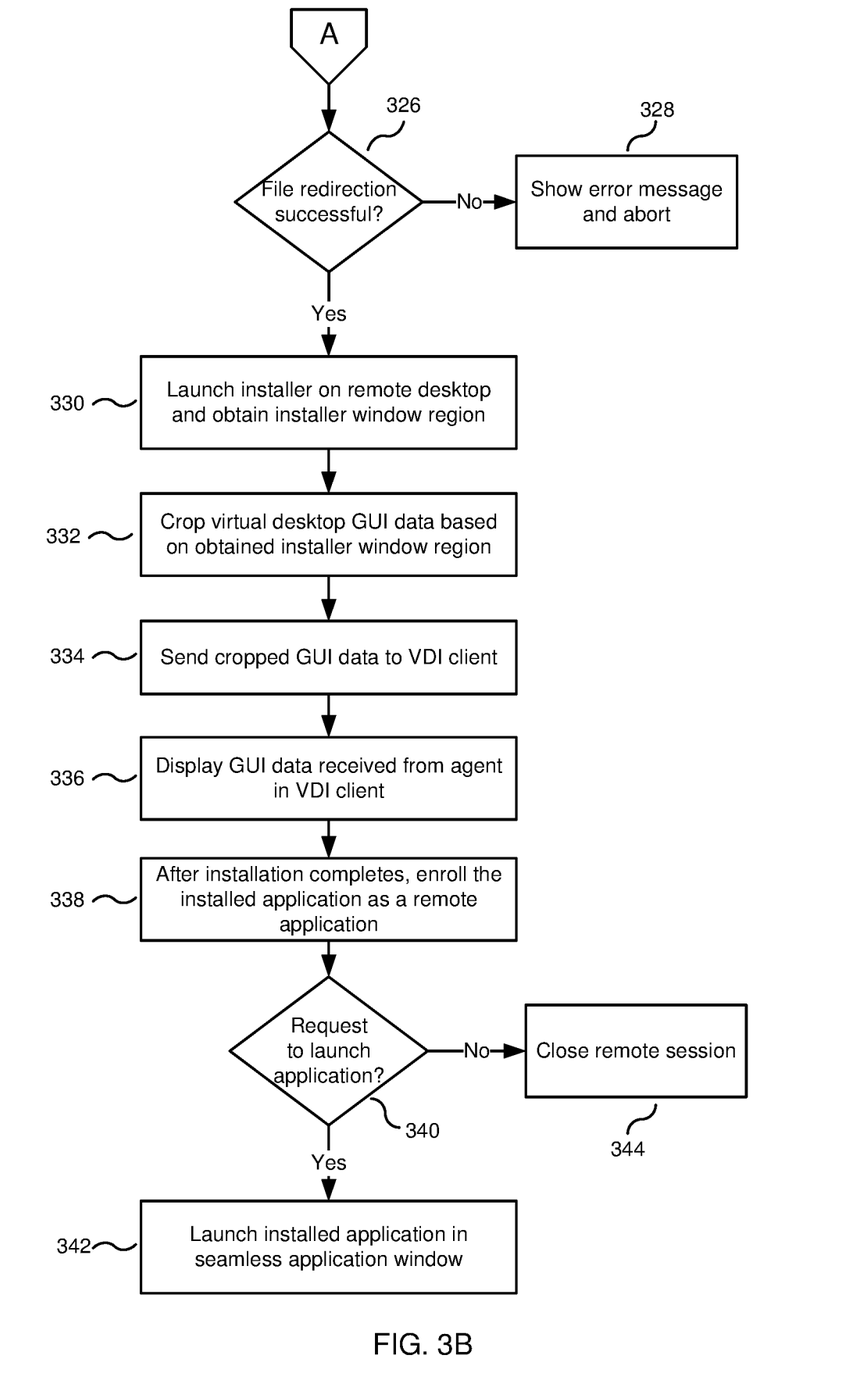
FIG. 3B illustrates the second part of an example process flow for installing applications in virtual desktops using installation files located on the local client device, in accordance with various embodiments.

FIG. 3B illustrates the second part of an example process flow for installing applications in virtual desktops using installation files located on the local client device, in accordance with various embodiments. FIG. 3B continues the process flow from FIG. 3A. After the installation file is redirected to the virtual desktop (in operation 324 of FIG. 3A), the process can check if the file redirection was successful, in decision 326. If redirection was not successful, then in operation 328 an error message can be produced, and the installation can be aborted. If, in decision 326, the file redirection was successful, then the process can continue to operation 330, where the installer can be launched on the remote desktop and the installer UI window region (e.g., size and position) can be obtained. For example, the installation file can be launched on the virtual desktop by the agent (e.g., while redirecting the file from the client device via CDR) and when the installation produces an installation UI window in the desktop GUI, the region (size and position) of the installation window can be obtained by the agent.

In operation 332, based on the obtained installer UI window region, the virtual desktop GUI data can be cropped. For example, the agent on the remote desktop can crop the GUI data of the remote desktop based on the installer window size and position to only keep the graphical data of the installer UI window. In operation 334, the cropped GUI data can be sent to the VDI client (e.g., by the agent). In operation 336, the GUI data received from the agent can be displayed in the VDI client. For example, the VDI client running on the user device can display the GUI data received from the agent in a VDI client window based on the installer window position.

In operation 338, after the installation completes the process can enroll the installed application as a remote application. For example, after the installation completes and the installer window is closed, the agent can communicate with the broker to enroll the newly installed application as a remote application to enable the broker to launch the application as a virtual application when requested.

After the installed application is enrolled as a seamless application, the user can be given the option to launch the application. For example, the virtual desktop client can provide an option in its user interface (e.g., in a popup dialog box) to launch the application. If the user requests to launch the application in operation 340, then the installed application can be launched in a seamless application window in operation 342. For example, the application can be launched as a virtual application by hiding other portions of the virtual desktop GUI and only displaying the application UI. If, in operation 340, the user opts not to launch the installed application, then the process can proceed to operation 344, where the remote session is closed.

In various embodiments, if the user desires to install a remote application from a local installation file when the user is already connected to the virtual desktop (and may be viewing the virtual desktop GUI in the VDI client), the process can follow a different path than described in FIGS. 3A and 3B. For example, after the user requests to install the application from the local installation file (e.g., by right clicking the file and selecting the remote desktop), the process can redirect the installation to the virtual desktop and launch the installer in the virtual desktop as described in the example of FIGS. 3A and 3B. However, because the user may already be viewing the virtual desktop GUI, the steps of obtaining the installer UI size and region and hiding portions of the desktop GUI other than the installer UI can be omitted.

Figure 4:
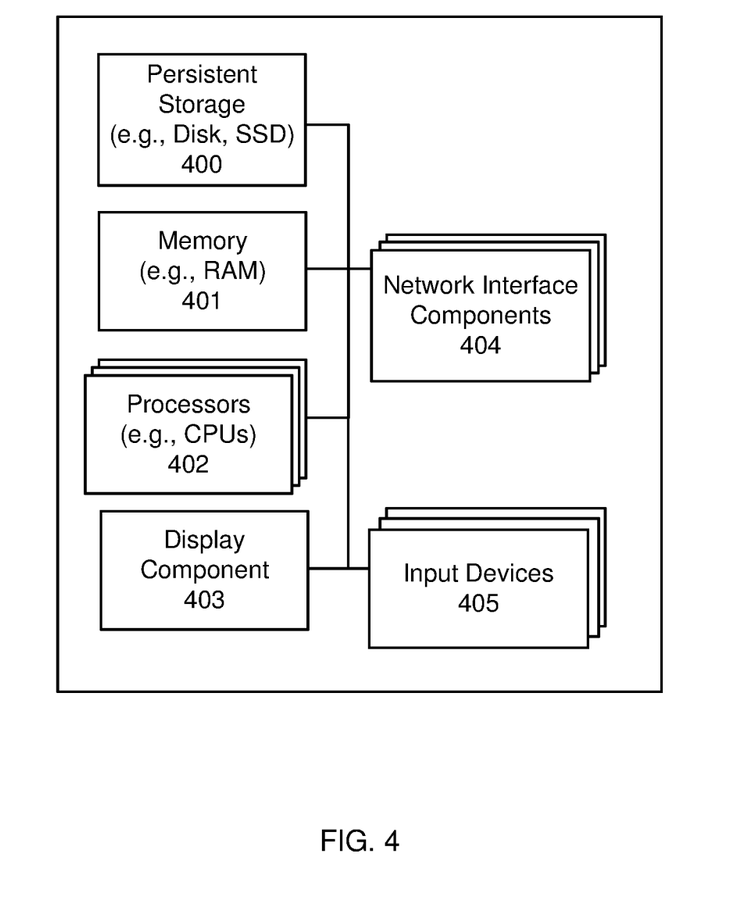
FIG. 4 illustrates an example of some general components of a computing device, in accordance with various embodiments.

FIG. 4 illustrates an example of some general components of a computing device, in accordance with various embodiments. In this particular example, the device includes one or more processors (e.g., central processing units (CPUs) 402 for executing instructions that can be stored in a storage medium component. The storage medium can include many types of memory, persistent data storage, or non-transitory computer-readable storage media. For example, the storage medium may take the form of random access memory (RAM) 401 storing program instructions for execution by the processor(s) 402, a persistent storage (e.g., disk or SSD) 400, a removable memory for sharing information with other devices and/or the like. The computing device typically can further comprise a display component 403, such as a monitor, a touch screen, liquid crystal display (LCD), or the like. In various embodiments, the computing device will include at least one input device 405 able to receive conventional input from a user. This conventional input can include, for example, a push button, touch pad, touch screen, wheel, joystick, keyboard, mouse, keypad, or any other such device or element whereby a user can input a command to the device. In some embodiments, the computing device can include a network interface component (NIC) 404 for communicating over various networks, such as Wi-Fi, Bluetooth, RF, wired, or wireless communication systems. The device in many embodiments can communicate over a network, such as the Internet, and may be able to communicate with other devices connected to the same or other networks.

Various embodiments described herein can be implemented in a wide variety of environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially-available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from those described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for installing an application in a virtual desktop using an installation file located on a client device, comprising:
   receiving a request on the client device to install the application in the virtual desktop on a server, wherein the installation file for the application is located on the client device; and
   in response to the request:
      establishing a virtual desktop session between the client device and the virtual desktop on the server over a network connection;
      redirecting the request to install the application from the client device to the virtual desktop on the server via the virtual desktop session and launching, on the virtual desktop on the server, an installation of the application using the installation file;
      receiving, from the virtual desktop, an input/output (I/O) request for the installation file located on the client device that has been routed by the virtual desktop to the client device in response to the I/O request for the installation file made at the virtual desktop, wherein the I/O request is routed by a client drive redirection (CDR) server that forwards I/O requests from the virtual desktop to a shared directory on the client device, wherein the shared directory on the client device is presented as a virtual drive on the virtual desktop; and receiving an installation user interface (UI) produced by the installation of the application at the virtual desktop and streamed from the virtual desktop to the client device.

2. The method of claim 1, further comprising:

displaying the streamed installation UI in a window on the client device;

receiving user inputs into the installation UI in the window; and conveying the received user inputs to the virtual desktop to be effectuated in the installation of the application.

3. The method of claim 1, further comprising:

in response to the request, establishing the virtual desktop session between a virtual desktop client operating on the client device and a virtual desktop agent operating in the virtual desktop;

streaming the installation UI to the virtual desktop client via the virtual desktop session and presenting the installation UI on the client device in a window of the virtual desktop client;

receiving user inputs into the installation UI in the window; and conveying the received user inputs to the virtual desktop agent via the virtual desktop session to be effectuated in the installation.

4. The method of claim 3, wherein streaming the installation UI to the virtual desktop client via the virtual desktop session and presenting the installation UI on the client device in the window of the virtual desktop client further comprises cropping display portions of the virtual desktop other than the installation UI.

5. The method of claim 3, further comprising: determining completion of the installation of the application on the virtual desktop; in response to the completion of the installation on the virtual desktop, providing an option in a user interface of the virtual desktop client to launch the application as a virtual application.

6. The method of claim 1, further comprising: on the client device, in response to a user interaction with a user interface element corresponding to the installation file, presenting the user with a context menu corresponding to the installation file, the context menu offering the user an option to install the application on the virtual desktop.

7. A computing device for installing an application in a virtual desktop using an installation file located on a client device, comprising:

at least one processor; and memory including instructions that, when executed by the at least one processor, cause the computing device to perform steps of:

receiving a request on the client device to install the application in the virtual desktop on a server, wherein the installation file for the application is located on the client device; and in response to the request:

establishing a virtual desktop session between the client device and the virtual desktop on the server over a network connection;

redirecting the request to install the application from the client device to the virtual desktop on the server via the virtual desktop session and launching, on the virtual desktop on the server, an installation of the application using the installation file;

receiving, from the virtual desktop, an input/output (I/O) request for the installation file located on the client device that has been routed by the virtual desktop to the client device in response to the I/O request for the installation file made at the virtual desktop, wherein the I/O request is routed by a client drive redirection (CDR) server that forwards I/O requests from the virtual desktop to a shared directory on the client device, wherein the shared directory on the client device is presented as a virtual drive on the virtual desktop; and receiving an installation user interface (UI) produced by the installation of the application at the virtual desktop and streamed from the virtual desktop to the client device.

8. The computing device of claim 7, wherein the memory further includes instructions that when executed by the at least one processor, cause the computing device to perform steps of:

displaying the streamed installation UI in a window on the client device;

receiving user inputs into the installation UI in the window; and conveying the received user inputs to the virtual desktop to be effectuated in the installation of the application.

9. The computing device of claim 7, wherein the memory further includes instructions that when executed by the at least one processor, cause the computing device to perform steps of:

in response to the request, establishing the virtual desktop session between a virtual desktop client operating on the client device and a virtual desktop agent operating in the virtual desktop;

streaming the installation UI to the virtual desktop client via the virtual desktop session and presenting the installation UI on the client device in a window of the virtual desktop client;

receiving user inputs into the installation UI in the window; and conveying the received user inputs to the virtual desktop agent via the virtual desktop session to be effectuated in the installation.

10. The computing device of claim 9, wherein streaming the installation UI to the virtual desktop client via the virtual desktop session and presenting the installation UI on the client device in the window of the virtual desktop client further comprises cropping display portions of the virtual desktop other than the installation UI.

11. The computing device of claim 9, wherein the memory further includes instructions that when executed by the at least one processor, cause the computing device to perform steps of:

determining completion of the installation of the application on the virtual desktop; and in response to the completion of the installation on the virtual desktop, providing an option in a user interface of the virtual desktop client to launch the application as a virtual application.

12. The computing device of claim 7, wherein the memory further includes instructions that when executed by the at least one processor, cause the computing device to perform steps of:

on the client device, in response to a user interaction with a user interface element corresponding to the installation file, presenting the user with a context menu corresponding to the installation file, the context menu offering the user an option to install the application on the virtual desktop.

13. A non-transitory computer readable storage medium for installing an application in a virtual desktop using an installation file located on a client device, comprising one or more sequences of instructions, the instructions when executed by one or more processors causing the one or more processors to execute operations of:
receiving a request on the client device to install the application in the virtual desktop on a server, wherein the installation file for the application is located on the client device; and
in response to the request:
establishing a virtual desktop session between the client device and the virtual desktop on the server over a network connection;
redirecting the request to install the application from the client device to the virtual desktop on the server via the virtual desktop session and launching, on the virtual desktop on the server, an installation of the application using the installation file;
receiving, from the virtual desktop, an input/output (I/O) request for the installation file located on the client device that has been routed by the virtual desktop to the client device in response to the I/O request for the installation file made at the virtual desktop, wherein the I/O request is routed by a client drive redirection (CDR) server that forwards I/O requests from the virtual desktop to a shared directory on the client device, wherein the shared directory on the client device is presented as a virtual drive on the virtual desktop; and
receiving an installation user interface (UI) produced by the installation of the application at the virtual desktop and streamed from the virtual desktop to the client device.

14. The non-transitory computer readable storage medium of claim 13, further comprising instructions that when executed by the one or more processors cause the one or more processors to execute operations of:
displaying the streamed installation UI in a window on the client device;
receiving user inputs into the installation UI in the window; and
conveying the received user inputs to the virtual desktop to be effectuated in the installation of the application.

15. The non-transitory computer readable storage medium of claim 13, further comprising instructions that when executed by the one or more processors cause the one or more processors to execute operations of:
in response to the request, establishing the virtual desktop session between a virtual desktop client operating on the client device and a virtual desktop agent operating in the virtual desktop;
streaming the installation UI to the virtual desktop client via the virtual desktop session and presenting the installation UI on the client device in a window of the virtual desktop client;
receiving user inputs into the installation UI in the window; and
conveying the received user inputs to the virtual desktop agent via the virtual desktop session to be effectuated in the installation.

16. The non-transitory computer readable storage medium of claim 15, wherein streaming the installation UI to the virtual desktop client via the virtual desktop session and presenting the installation UI on the client device in the window of the virtual desktop client further comprises cropping display portions of the virtual desktop other than the installation UI.

17. The non-transitory computer readable storage medium of claim 13, further comprising instructions that when executed by the one or more processors cause the one or more processors to execute operations of on the client device, in response to a user interaction with a user interface element corresponding to the installation file, presenting the user with a context menu corresponding to the installation file, the context menu offering the user an option to install the application on the virtual desktop.

* * * * *